US010203267B2

(12) United States Patent
D'Orlando et al.

(10) Patent No.: US 10,203,267 B2
(45) Date of Patent: Feb. 12, 2019

(54) HEALTH AND USAGE MANAGEMENT OF AN ENVIRONMENTAL CONTROL SYSTEM

(71) Applicant: Hamilton Sundstrand Corporation, Windsor Locks, CT (US)

(72) Inventors: Paul D'Orlando, Simsbury, CT (US); Rosanna C. Glynn, Cromwell, CT (US); William R. Fiske, Springfield, MA (US); Christopher McAuliffe, Windsor, CT (US); Thomas M. Zywiak, Suffield, CT (US); Fanping Sun, Glastonbury, CT (US); Joseph V. Mantese, Ellington, CT (US); Radoslaw Zakrzewski, South Burlington, VT (US); Bernard Dion, North Ferrisburgh, VT (US); Meade G. Ferrigan, Granby, MA (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 731 days.

(21) Appl. No.: 14/323,368

(22) Filed: Jul. 3, 2014

(65) Prior Publication Data
US 2016/0003491 A1 Jan. 7, 2016

(51) Int. Cl.
F24F 11/00 (2018.01)
G01M 17/00 (2006.01)
(Continued)

(52) U.S. Cl.
CPC ............ *G01M 17/00* (2013.01); *B64D 13/00* (2013.01); *F24F 11/30* (2018.01); *F24F 11/62* (2018.01);
(Continued)

(58) Field of Classification Search
CPC ........................................................ G08B 1/08
(Continued)

(56) References Cited

U.S. PATENT DOCUMENTS 4,213,114 A * 7/1980 Cochard ................ G01H 1/003
340/508
5,383,133 A * 1/1995 Staple ................... B64C 27/001
340/963
(Continued)

FOREIGN PATENT DOCUMENTS

CA 2761918 A1 11/2010
WO 2004053474 A2 6/2004

OTHER PUBLICATIONS

European Search Report Application No. EP15173418, dated Aug. 31, 2015, pp. 23.
(Continued)

Primary Examiner — Paul D Lee
(74) Attorney, Agent, or Firm — Cantor Colburn LLP

(57) ABSTRACT

A method includes receiving a sampled input, the sampled input being a result of a detection device sensing a plurality of environmental conditions by an air cycle machine; processing the sampled input to detect whether the plurality of environmental conditions includes a deviation from an expected operation of the air cycle machine; and generating a notification output in response to the plurality of environmental conditions including the deviation from the expected operation of the air cycle machine.

13 Claims, 2 Drawing Sheets

(51) Int. Cl.
- *G01M 15/14* (2006.01)
- *B64D 13/00* (2006.01)
- *G01H 1/00* (2006.01)
- *F24F 11/30* (2018.01)
- *F24F 11/62* (2018.01)
- *F24F 11/70* (2018.01)
- *B64D 45/00* (2006.01)
- *F24F 110/00* (2018.01)
- *F24F 11/32* (2018.01)
- *F24F 11/63* (2018.01)

(52) U.S. Cl.
CPC .............. *F24F 11/70* (2018.01); *G01H 1/003* (2013.01); *G01M 15/14* (2013.01); *B64D 2045/0085* (2013.01); *F24F 11/32* (2018.01); *F24F 11/63* (2018.01); *F24F 2110/00* (2018.01)

(58) Field of Classification Search
USPC ....... 702/104, 127, 141, 150, 160, 182, 184, 702/188; 340/539.16; 348/77
See application file for complete search history.

(56) References Cited

U.S. PATENT DOCUMENTS

| | | | | |
|---|---|---|---|---|
| 6,058,715 A * | 5/2000 | Strang | ................... | B64D 13/06 62/172 |
| 8,849,475 B1 * | 9/2014 | Sudolsky | ............. | G05D 1/0055 701/2 |
| 2005/0021296 A1 * | 1/2005 | Aritsuka | ................... | G06F 8/60 702/183 |
| 2005/0083196 A1 * | 4/2005 | Furem | ...................... | E02F 9/205 340/539.16 |
| 2006/0279427 A1 * | 12/2006 | Becker | ................. | A61B 5/0002 340/573.4 |
| 2008/0312783 A1 * | 12/2008 | Mansouri | ............. | G07C 5/0808 701/31.4 |
| 2009/0110541 A1 * | 4/2009 | Southwick | .............. | F01D 21/04 415/119 |
| 2012/0107094 A1 * | 5/2012 | Lillis | ....................... | F01D 17/06 415/118 |
| 2013/0130734 A1 * | 5/2013 | Rice | .................... | G01M 5/0066 455/517 |
| 2013/0201316 A1 * | 8/2013 | Binder | ................... | H04L 67/12 348/77 |
| 2014/0008035 A1 | 1/2014 | Patankar et al. | | |
| 2014/0032728 A1 * | 1/2014 | O'Neil | .............. | H04W 52/0254 709/223 |

OTHER PUBLICATIONS

F Canagallo et al: "Winter 1998 13 National Instrument", Jan. 1, 1998 (Jan. 1, 1998), p. 13, XP055210145; Retrieved from the Internet :URL:https:/ /www.n. com /pdf /newsletters /us/winter98_nlback.pdf [retrievedonAug. 28, 2015].

* cited by examiner

HEALTH AND USAGE MANAGEMENT OF AN ENVIRONMENTAL CONTROL SYSTEM

BACKGROUND

The disclosure relates generally to monitoring for indications of and/or fatigue failures, and more specifically, to detection of deviations from an expected operation that lead to fatigue failures of a rotary machine of an environmental control system.

In general, a system through overuse and untimely maintenance will have fatigue failures. Servicing methods addressing system fatigue failures include reactionary maintenance and maintenance checks. Reactionary maintenance is an action that is in direct response to clear signs of a pending fatigue failure or an actual fatigue failure. A clear fatigue failure sign is any recognizable event, such as noise or smoke, from a system. A fatigue failure is a system breakdown, which may result from neglecting clear fatigue failure signs or from unavailability of such signs prior to the fatigue failure. Maintenance checks are actions that search for clear fatigue failure signs before the resulting fatigue failure occurs. However, reactionary maintenance and maintenance checks put the system out-of-commission until the servicing method is complete, thereby negatively affecting an operation time of the system.

For example, in an aircraft environment, an air cycle machine connected to an environmental control system utilizes an air cycle cooling process to output cool air directly into an aircraft cabin or onto electronic equipment for ventilation/cooling. If the air cycle machine exhibits a clear fatigue failure sign (e.g., smoke generation, unexpected operation noise, etc.) or has a fatigue failure (e.g., fatigue failure of fan blades, blade loss, blade/housing contact, etc.), the air cycle machine must receive reactionary maintenance. Yet, reactionary maintenance is costly, as a usual result is to entirely replace the fatigued air cycle machine, which puts the aircraft unexpectedly out-of-commission until the reactionary maintenance is complete. Further, rather than wait for an air cycle machine to exhibit a clear fatigue failure sign or have a fatigue failure, the air cycle machine may go through scheduled maintenance checks. Yet, like reactionary maintenance, scheduled maintenance checks are also costly because these checks guarantee that the aircraft will be regularly out-of-commission, while providing no guarantee that the scheduled maintenance checks will discover a fatigue failure.

BRIEF DESCRIPTION OF THE INVENTION

According to one embodiment, a method includes receiving a sampled input, the sampled input being a result of a detection device sensing a plurality of environmental conditions by an air cycle machine; processing the sampled input to detect whether the plurality of environmental conditions includes a deviation from an expected operation of the air cycle machine; and generating a notification output in response to the plurality of environmental conditions including the deviation from the expected operation of the air cycle machine.

According to another embodiment, a computer program product comprises a computer readable storage medium having program instructions embodied therewith, the program instructions executable by a processor to cause a receiving of a sampled input, the sampled input being a result of a detection device sensing a plurality of environmental conditions by an air cycle machine; a processing of the sampled input to detect whether the plurality of environmental conditions includes a deviation from an expected operation of the air cycle machine; and a generating of a notification output in response to the plurality of environmental conditions including the deviation from the expected operation of the air cycle machine.

According to yet another embodiment, a system includes a management facility and is configured to receive a sampled input, the sampled input being a result of a detection device sensing a plurality of environmental conditions by an air cycle machine; process the sampled input to detect whether the plurality of environmental conditions includes a deviation from an expected operation of the air cycle machine; and generate a notification output in response to the plurality of environmental conditions including the deviation from the expected operation of the air cycle machine.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
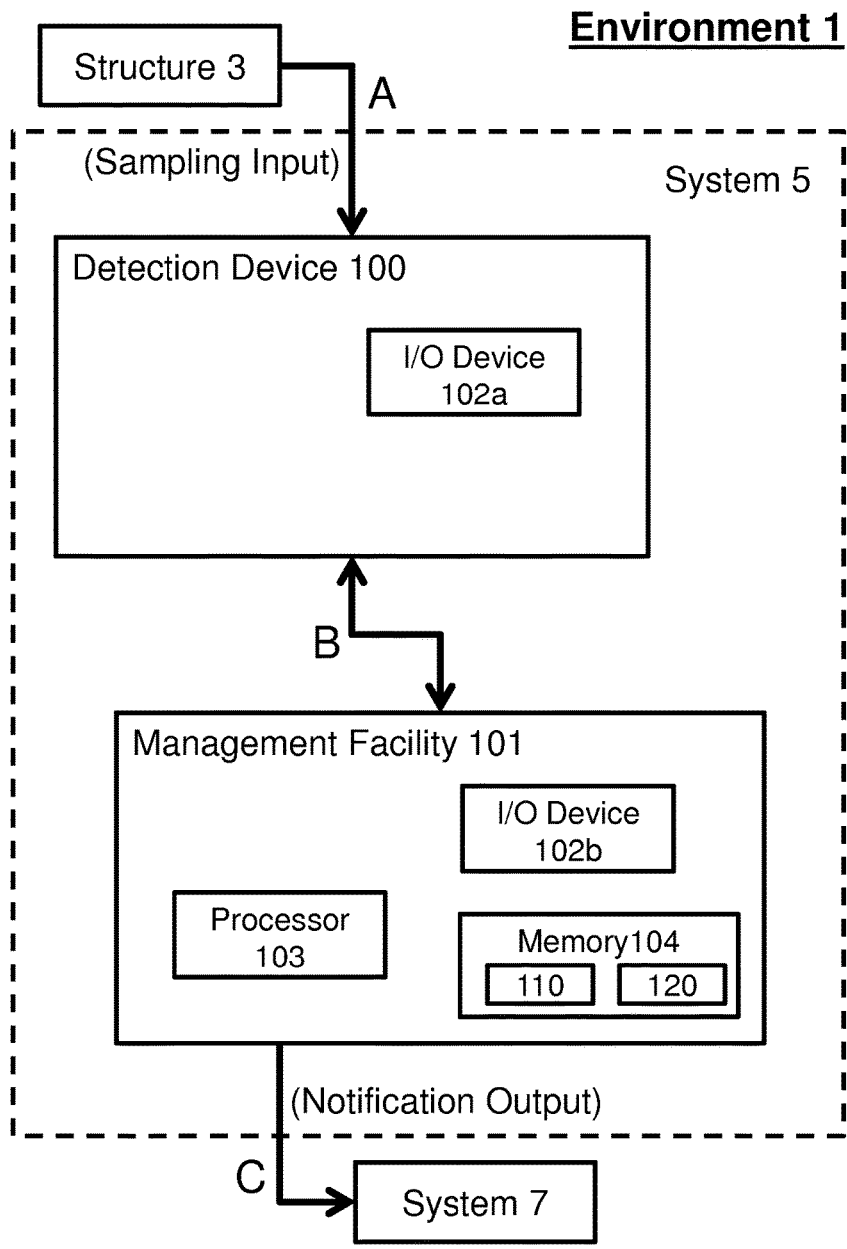
FIG. 1 illustrates a management system.

As indicated above, a system through overuse and untimely maintenance will have fatigue failures. Servicing methods addressing system fatigue failures, such as reactionary maintenance and maintenance checks, are costly with respect to the unexpected and scheduled amounts of time that the system is out-of-commission. Thus, what is needed is a system and method that identifies deviations from an expected operation of a structure before those deviations develop into the clear signs of fatigue failures and/or the fatigue failures themselves. In turn, the system and method enables structure servicing to be directly scheduled on an as needed basis, thereby minimizing the out-of-commission time due to reactionary maintenance and/or unnecessary maintenance checks.

In general, embodiments of the present invention disclosed herein may include a management system, method, and/or computer program product that performs a deviation detection and notification process. For example, a management system and method generally includes performing the deviation detection and notification process by monitoring a structure, such as a rotary machine, for deviations from an expected operation of the structure and producing notifications in response to the deviations that cause servicing for the structure to be directly scheduled on an as needed basis. Deviations from an expected operation are minute, irregular, and/or trending events or pulsations that are not easily recognizable to human or sensor observation and that deviate from an expected operation.

For instance, with respect to performing the deviation detection and notification process in the aircraft environment example, an air management control system in conjunction with a health and usage management system detects occurrences of vibration trends and/or irregularities that correlate to deviations of an expected operation of an air cycle machine (e.g., structure of rotary machine). Examples of deviations from expected operations of the air cycle machine may include issues with components of the air cycle machine, such as a rotor, air cycle machine compressor, air cycle machine fan, independent ram air fan, and cabin air. In some instances, a deviation or "surge" is a pneumatic event related to fluid flow within the air cycle machine that causes unexpected vibrations (e.g., the vibration level under surge may go down or up when compared to non-surge scenarios).

In operation, the air management control system utilizes a detector to sample operations of the air cycle machine and sends those samples to a controller. The controller processes the sampled operations to detect deviations from an expected operation, and when deviations are detected, communicates the deviations to the health and usage management system so that a maintenance action may be taken to directly address the deviations (e.g. vibration indicators that correlate to deviations may suggest low levels of fatigue with any of the components of the air cycle that after some time, if not addressed, may lead to failure; so the health and usage management may schedule a condition action and/or continue monitoring of the air cycle machine until the deviations reach a predefined level). Thus, deviations from the expected operation are utilized by the air management control system to avoid the clear signs of fatigue failures, actual fatigue failures, and any related reactionary maintenance and/or unnecessary maintenance checks.

Systems and/or computing devices, such as management system and method (e.g., environment 1, systems 5, 7 and management facility 101 of FIG. 1), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, a tablet device, a mobile device, bay-type computing device, or some other computing system and/or device.

In general, computing devices may include a processor (e.g., a processor 103 of FIG. 2) and a computer readable storage medium (e.g., a memory 104 of FIG. 1), where the processor receives computer readable program instructions, e.g., from the computer readable storage medium, and executes these instructions, thereby performing one or more processes, including one or more of the processes described herein (e.g., a deviation detection and notification process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to configure the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc. In view of the aircraft environment example, the network may be aircraft data network.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the management system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the management system and method.

FIG. 1 illustrates a management system and method as an environment 1, which includes a structure 3, a system 5, and a system 7. The system 5 includes a detection device 100 and a management facility 101, where the detection device 100 comprises an input output (I/O) device 102a and the management facility comprises an I/O device 102b, a processor 103, and a memory 104. The memory of the management facility 101 includes a management application 110, which may include modules, and a storage database 120, which manages configuration files.

The environment 1 and items therein may include and/or employ any number and combination of computing devices and networks utilizing various communication technologies, as described above, that enable the system 5 to perform deviation detection and notification processing. In operation, the environment 1 enables the structure 3 to provide sampling inputs to the system 5 that, in turn, provides notification outputs to the system 7. For instance, the detection device 100 of the system 5 samples vibrations on the structure 3 (e.g., arrow A). The detection device 100 communicates (e.g., arrow B) the sampled vibrations to the management facility 101, which in turn utilizes the processor 103 to perform on the sampled input the deviation detection and notification processing, in accordance with instructions provided from the memory 104 by the management application 110 and/or the configuration files managed by the storage database 120. The management facility 101, in response to the processing, communicates (e.g., arrow C) the notification output to the system 7. The notification output may include any deviations of an expected operation of the structure 3 within the received sampled input. Then, the system 7 initializes maintenance scheduling for the structure 3 in accordance with the received notification output. Thus, the deviation detection and notification processing by the environment 1 identifies deviations of an expected operation at inception and/or before those deviations develop into a fatigue failure of the structure 3, which enables direct and timely maintenance of the structure 3 and avoids unnecessary maintenance checks when there are no clear fatigue failure signs.

Examples of environment 1 include, but are not limited to, aircraft environments within aircraft such as planes, helicopters, etc.; watercraft environments within watercraft such as boats, submarines, etc.; and the like. Thus, if the environment 1 is the aircraft environment, the structure 3 may include the air cycle machine, the system 5 may include the environmental control system, and the system 7 may include the health and usage management system. Further, the detection device 100 may be the accelerometer that is configured to sample/detect vibrations (e.g., sampling input) by the air cycle machine. The air management control system (e.g., the management facility 110) and the accelerometer may utilize wired and/or wireless transceivers (e.g., I/O device 102a, 102b) to transfer the sampled/detected vibrations by the accelerometer to an air cycle machine controller. An air cycle machine controller (e.g., processor 103) is configured to process the sampled/detected vibrations for deviations of an expected operation of the air cycle machine. The air management control system then reports (e.g., notification output) to the health and usage management system (e.g., system 7) any deviations identified within the sampled/detected vibrations and/or instructions with respect to a type of fatigue failure. Thus, the air management control system in conjunction with the health and usage management system detects deviations of the expected operation of the air cycle machine via vibrations.

The structure 3 may include any device that converts energy into mechanical motion, such as pneumatic, hydraulic, and electric motors, such as a rotary machine. For instance, pneumatic motors or compressed air engines utilize compressed air energy to mechanical work through either linear motion (e.g., from either a diaphragm or piston actuators) or rotary motion (e.g., from vane type or piston air motors). In addition, pneumatic motors may operate under expected conditions or surge conditions, each of which include different flow rates and shaft speeds, which further enhances the difficulty in detecting surges (e.g., because vibration changes due to surges may be missed as the pneumatic motors change operating conditions). Due to these properties of compressed air, pneumatic motors are generally maintained via reactionary maintenance and maintenance checks. The structure 3 is capable of operating in a safe mode, when a fatigue failure indicator is detected by the system 5, such that the conversion of energy into mechanical motion occurs at a reduced rate and the chance of a fatigue failure by the structure 3 is less likely.

The system 5 is generally a processing portion of the environment 1 that receives (e.g., arrow A) sampling inputs from the structure 3 and provides (e.g., arrow C) notification outputs to a system 7.

The system 7 is generally a data collection and analysis portion of the environment 1 that receives (e.g., arrow C) notification outputs from the system 5. The system 7 receives the notification outputs (e.g., arrow C), which includes the deviations of the expected operation, the instructions, and/or other fault data, from the system 5 to initiate maintenance of the structure 3. In view of the aircraft environment example, the system 7 may include the health and usage management system, which comprises or is connected to a cockpit avionics system and/or a central maintenance computer, such that maintenance of the structure 3 is initiated as further described below.

The detection device 100 may include any converter that measures and converts environmental conditions and/or a physical action into a signal that is read by an instrument or an observer. Examples of environmental conditions and/or a physical action include, but are not limited to, vibration, light, motion, temperature, magnetic fields, gravity, humidity, moisture, pressure, electrical fields, sound, and the like. The detection device 100 may also include any hardware, software, or combination of hardware and software to convert measured quantities and to transmit the measured quantities (e.g., through wired and/or wireless connections). The detection device 100 may measure and store the physical actions at pre-defined times, in response to an event, in accordance with the overall physicality of the environment 1. The detection device 100 may communicate the physical actions via a first wired and/or wireless transceiver to a second transceiver, wherein the first wired and/or wireless transceiver may be integrated into (e.g., as illustrated in FIG. 1) or external to the detection device 100. Thus, the detection device 100 of the system 5 is configured to convert/sample environmental conditions and/or physical actions by the structure 3 (e.g., receive the sampling input, arrow A) and communicate (e.g., arrow B) via the I/O device 102a the converted/sampled physical actions to the I/O device 102b of the management facility 101. Examples of the detection device 100 include capacitive spring mass base, electromechanical, laser accelerometer, low frequency, magnetic induction, optical, piezoelectric accelerometer, resonance, seat pad, strain gauge, and surface acoustic wave accelerometers and/or include a wireless sensor with an integrated accelerometer. Further, while the detection device 100 may be a part of the management facility 101 (as illustrated in FIG. 1), the detection device 100 may also be incorporated into a housing of the structure 3 and/or the management facility 101.

In view of the aircraft environment example, the detection device 100 may be the accelerometer that is configured to sample/detect environmental conditions, such as vibrations, by the air cycle machine. Further, the accelerometer may measures and stores the sampled/detected vibrations at pre-defined times and rates (e.g., at a sampling rate of 200 Hz, 400 Hz, 600 Hz, 800 Hz, 1000 Hz, 1200 Hz, etc.), based on the overall vibratory environment of the air cycle machine, throughout flight and on the ground. In one example, the detection device 100 may operate in a low power mode (e.g., or sleep mode) that senses environmental conditions and/or physical actions. Further, the detection device 100 is converted into full power mode upon sensing an event within the environmental conditions and/or physical actions (e.g., after a predetermined period of time passes and/or a vibration over a threshold amplitude). The predetermined period of time may include a periodic wake up feature that upon waking up enables the detection device 100 to assess the environmental conditions locally (intelligent sensor) or wait for data acquisition commands from an external system. For example, the predetermined period of time may be a value of 5 minutes, 10 minutes, 15 minutes, 20 minutes, 25 minutes, 30 minutes, etc. that may be related to a second condition, such as initiation of an operation of the structure, of a landing of an aircraft, of a cruising of the aircraft, etc. The threshold amplitude may be any amplitude that is outside of an expected operation condition by the air cycle machine (e.g., vibration trends and/or irregularities are minute, irregular, and/or trending events or pulsations that are not easily recognizable to human or sensor observation and that deviate from an expected operation). For example, the threshold amplitude may be a value that is greater than expected vibration amplitude operations and/or is equal to the 1.1, 1.2, 1.3, etc. times the expected amplitude.

The management facility 101 may include any hardware, software, or combination of hardware and software configured to perform deviation detection and notification processing. As illustrated in FIG. 1, the management facility 101 may be a standalone device (e.g., implemented in a computing device as described above) that includes one or more I/O interfaces (e.g., I/O device 102b), processors (e.g., processor 103), and memories (e.g., memory 104), each of which communicates via a system bus (not shown). Further, the management facility 101 may be directly connected to and/or integrated with other components (e.g., structure 3), devices (e.g., the detection device 100), and systems (e.g., system 7), or connected via a network as described above (e.g., the aircraft data network). Thus, the management facility 101 utilizes the management application 110 and a storage database 120 to operate the I/O device 102b and the processor 103, so as to monitor the structure 3 for operation trends and/or irregularities that equate to deviations and produce notifications in response to the deviations that cause servicing for the structure 3 to be directly scheduled on an as needed basis.

I/O devices 102a, 102b may include any physical and/or virtual I/O interface or device utilized to communicate between elements internal and/or external to the environment 1. Examples of I/O devices 102a, 102b include transmitters, receivers, transceivers, transceiver network cards, network interface cards, and the like that are configured to transmit and/or receive signals in accordance with wired and wireless communication technologies. Thus, the I/O device 102b may be configured to receive and/or send signals or data within or for the management facility 101. Further, the I/O device 102 may be configured to facilitate queries to the detection device 100 for any stored converted/detected physical actions at pre-defined times, in response to an event, etc. A query, in general, is an information retrieval activity of obtaining information relevant to an information need (e.g., desire to discover fatigue failure indicators within the converted/detected physical actions). Information retrieval activity initiates searches based on metadata, full-text indexing, timers, sampling rates, etc. Thus, for example, the query may initiate or cause the management application 110 to perform the deviation detection and notification process. Further, the query may be received and/or generated in response to a user input indicating a search for information, at pre-defined times, in response to an event, etc.

The I/O devices 102a, 102b may also process any converted/detected physical action into a fatigue failure indicator in accordance with the configuration data set or file as directed by the management facility 101, and transmit that fatigue failure indicator to the processor 103. In view of the aircraft example above, the I/O device 102b may be a wired and/or wireless transceiver (as noted above) that upon a landing event by the aircraft, facilities queries to the accelerometer for any stored sampled/detected vibrations. Further, in some aircraft environment, surge events are more likely on the ground, so detection device 100 would not waste energy (particularly if battery powered) to acquire vibration data in flight and thus a query activity on the ground may include the detection sensor 100 sampling the data and then sending it to the management facility 101. Also, the any stored sampled/detected vibrations may be transmitted from the detection device 100 in flight, without waiting for a landing event.

The processor 103 may include any processing hardware, software, or combination of hardware and software that carries out the computer readable program instructions by performing arithmetical, logical, and/or input/output operations. In general, the processor 103 of the management facility 101 receives computer readable program instructions as defined by the management application 110 from the memory 104 and executes these instructions, thereby performing one or more processes, such the deviation detection and notification process. Examples of the processor 103 include, but are not limited to an arithmetic logic unit, which performs arithmetic and logical operations; a control unit, which extracts, decodes, and executes instructions from a memory; an array unit, which utilizes multiple parallel computing elements; and a digital signal processor, which is a specialized microprocessor with an architecture optimized for the operational needs of digital signal processing. In view of the aircraft example above, the processor 103 may be the air cycle machine controller and, along with the accelerometer and the wired and/or wireless transceiver, include or interface with the air cycle machine.

The memory 104 may include a tangible device that retains and stores computer readable program instructions, as provided by the management application 110, for use by the processor 103 of the management facility 101. For example, the memory 104 may store a management application 110, sampling inputs received from the detection device 100, and notification outputs resulting from the received sampling inputs. Further, the memory 104 may manage the storage database 120 that stores the configuration data set or files (as described below) for use by the management application 110.

The management application 110 may include computer readable program instructions configured to perform the fatigue failure detection and notification process. The management application 110 may utilize modules and configuration data sets or files of the storage database 120 to operate the I/O device 102 and the processor 103, so as to monitor the structure 3 for operation trends and/or irregularities that equate to deviations and produce notifications in response to the deviations that cause servicing for the structure 3 to be directly scheduled on an as needed basis. Thus, the management application 110 may cause the detection of deviations in real-time as environmental conditions and/or physical actions are converted/detected; the placing of the detection device 100 into the low power mode; the placing of the structure 3 into the safe mode; the generation of the configuration data set or files based on user inputs, environment 1 feedback, etc.; the storage of the configuration data in the storage database 120; and the generation and communication of the notification outputs. The notification outputs, in general, are a report mechanism for delivering and/or identifying information (or non-existence of the information) by the management application 110. Examples of report mechanisms may include, but are not limited to, illuminated lights, text messaging (e.g., SMS), audio alerts (e.g., telephone calls, cellphone calls, VoIP calls, voicemails, loudspeaker announcements, etc.), electronic mail (e.g., POP, IMAP, SMTP), desktop alerts (e.g., dialog, balloon, modal window, toast, etc.), pager (e.g., SNPP), instant messaging (e.g., IRC, ICQ, AIM, Yahoo! Messenger, MSN, XMPP, iMessage), and the like.

In view of the aircraft environment above, the management application 110 is an air management software application of the air management control system that is configured to detect and differentiate between compressor vibration surges and fan vibration surges by vibration spectrum characteristics (e.g., as dictated by parameters of the configuration data set or file). Further, the air management software application detects the difference between the vibration spectrum characteristics of an air cycle machine operating under expected conditions or surge conditions at a given ram flow rate and air cycle machine shaft speed (e.g., as dictated by parameters of the configuration data set or file). The air management software application is also configured to generate notification outputs to an aircraft cockpit, upon or after landing, before take-off, after taxiing away from the gate, while at the gate, etc., via the cockpit avionics system. In operation, the air management software application may access the accelerometer, which has stored sampled/detected vibrations by the air cycle machine in response to sensing vibrations over the threshold amplitude and/or based on the overall vibratory environment, throughout a flight. Upon or after landing, etc., the air management software application facilitates through the wired and/or wireless transceivers the query the accelerometer for the sampled/detected vibrations that the accelerometer may have stored. The air management software application then, through the wired and/or wireless transceivers, receives from the accelerometer the stored sampled/detected vibrations. The air management software application then detects deviations from operations from the stored sampled/detected vibrations (e.g., surge vibrations). The air management software application then communicates deviations to the air cycle machine controller. The air management software application then causes air cycle machine controller to logically combine the deviations into fault data that is sent to the cockpit avionics system, central maintenance computer and/or to portable maintenance equipment operated by maintenance crew (e.g., such as a central computer or a handheld device carried by a maintenance person). The fault data provided to the cockpit avionics system drives a maintenance check of the air cycle machine. For example, the air management software application may message the cockpit, upon landing, via the cockpit avionics system. This message is noted by the aircrew or maintainer, who then, per procedure, checks the central maintenance computer for fault data. The air management software application may associate the surge fault found on the central maintenance computer to a maintenance check for blockage on the pack heat exchanger or other potential failure condition. The maintainer will then inspect the heat exchanger, and if blockage is found, plan appropriate maintenance.

The storage database 120, in general, may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage database 120 may generally be included within the memory 104 of the management facility 101 employing a computer operating system such as one of those mentioned above, and are accessed via a network in any one or more of a variety of manners. The storage database 120 is in communication with the management application 110 of and/or applications external to the management facility 101, such that information is provided to the management application 110 to perform operation described herein (e.g., to perform a deviation detection and notification process). The storage database 120 may be a part of the management application 110, run independently within the same device or system as the management application 110 (as illustrated in FIG. 1), or be an external to and in communication with the management application 110.

The storage database 120 may include a database, as described above, capable of collecting and archiving configuration data sets or files and the plurality of sampling inputs indicating the physical actions of the structure 3 received via I/O interface 102. The configuration data sets or files are items that govern how the application 110 performs the deviation detection and notification process by defining sampling rates, sampling intervals or times, overall environmental conditions, threshold values, low power mode settings, full power mode settings, metadata, full-text indexing, timers, the safe mode credentials, notification outputs and/or procedures, etc. The configuration data sets or files may be generated based on user inputs, environment 1 feedback, etc., the safe mode credentials, and/or the notification procedures. The configuration data sets or files may also identify a type of structure 3 within the environment 1, be updated to add settings, structures and/or systems, and identify a type of fatigue failure indicator (e.g., indicators that corresponds to rotor, air cycle machine compressor, air cycle machine fan, independent ram air fan, and cabin air compressor vibration surges). The storage database 120 may further communicate with other systems that may be internal or external to system 5.

The environment 1 and elements therein may take many different forms and include multiple and/or alternate components and facilities, and while the environment 1 is shown in FIG. 1, the components illustrated in FIG. 1 are not intended to be limiting. Indeed, additional or alternative components and/or implementations may be used. For example, while single items are illustrated for the management application 110 (and other items), these representations are not intended to be limiting and thus, the management application 110 items may represent a plurality of applications. Further, it should be understood that the same operability may be provided using any modular breakdown of the management application 110. Furthermore, although it is not specifically illustrated in the figures, the management application 110 may further include a user interface module and an application programmable interface module; however, these modules may be integrated with other modules in any modular breakdown. A user interface module may include computer readable program instructions configured to generate and manage user interfaces that receive inputs and present outputs. An application programmable interface module may include computer readable program instructions configured to specify how other modules, applications, devices, and systems interact with each other.

The environment 1 will now be described with reference to an aircraft environment; however, the use of the aircraft environment is for ease of explanation and in no way is the environment 1 and/or the management system and method intended to be limited to the aircraft environment. Further, in view of the aircraft environment above, the management facility 101 and the operations of the management facility 101 will be described with reference to FIG. 2.

Figure 2:
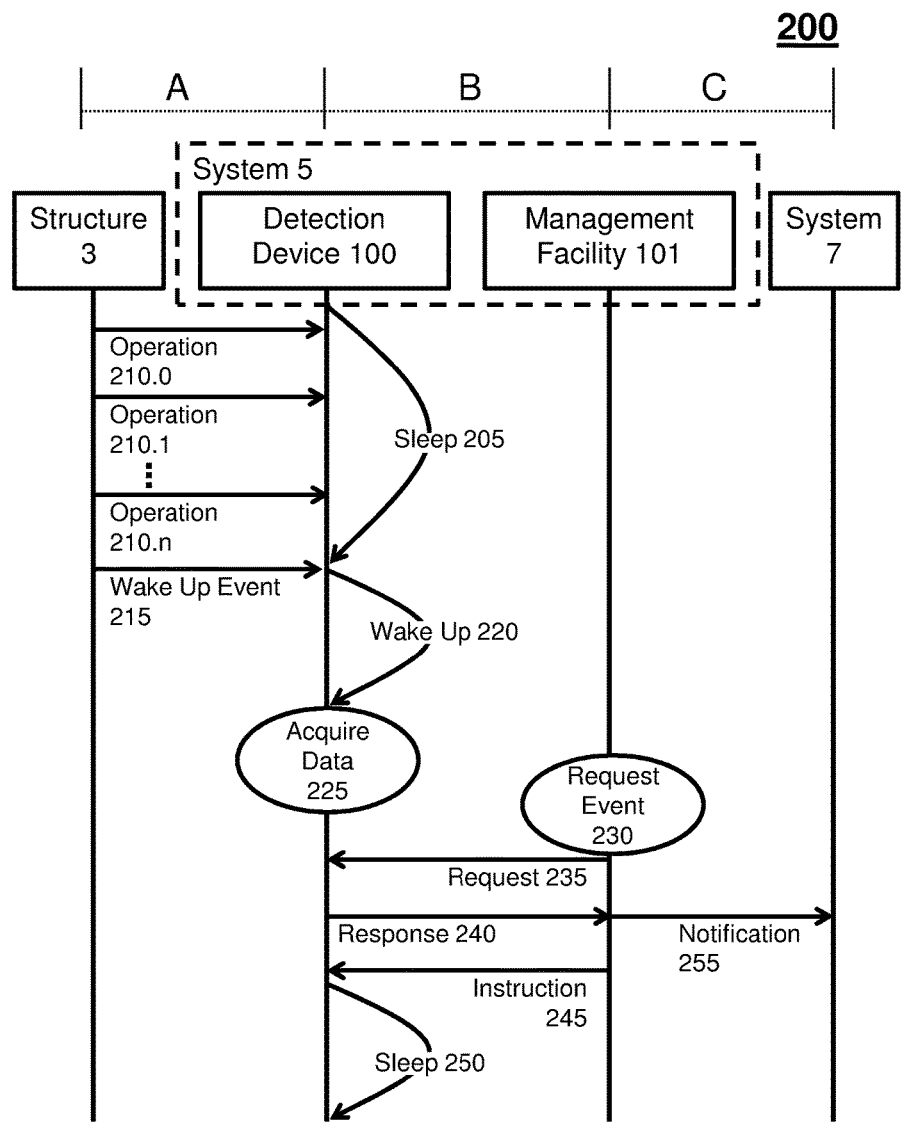
FIG. 2 illustrates a process flow of management system.

FIG. 2 illustrates a process flow 200 of the environment 1. The process 200 is not limiting an order or a grouping of operation arrows/circles. In fact, the operation arrows may be executed in sequence, concurrently, or the operation arrows/circles may sometimes be executed in the reverse order, depending upon the operability involved. In FIG. 2, different operation arrows/circles align vertically with different segments A-D and items 100, 102 to illustrate where these operations occur with respect to the environment 1 of FIG. 1.

Process 200 is a conceptual process and data flow diagram between the air cycle machine (e.g., structure 3), the accelerometer (e.g., detection device 100), the wired and/or wireless transceivers (e.g., I/O devices 102a, 102b), the air cycle machine controller (e.g., controller 103), and the health and usage management system (e.g., system 7), which includes the cockpit avionics system and the central maintenance computer. The process 200 begins at arrow 205 where the accelerometer is in sleep mode. The accelerometer remains in sleep mode until a wake up event (e.g., based on a predetermined time or so long as the air cycle machine outputs vibrations that are lower than the threshold amplitude). That is, as illustrated in FIG. 2, the accelerometer remains in sleep mode while environmental conditions and/or physical actions (e.g., arrows 210.0 to 210.n, where 'n' is an integer representing a sample number) are received. Although one exemplary numbering sequence for the arrows 210.0 to 210.n is offered, it should be understood that the same operability may be provided using fewer, greater, or differently implemented sequences. In response to a wake up event (e.g., arrow 215), such as the conclusion of a predetermined time or a surge vibration, the process 200 proceeds to arrow 220 where the accelerometer wakes up, samples, and stores (e.g., circle 225) the environmental conditions and/or physical actions outputted by the air cycle machine as data.

The process 200 next waits for a request event (e.g., circle 230), such as the aircraft landing or a conclusion of another time interval, to initiate a request (e.g., arrow 235) by the air cycle machine controller (of the management facility 101) to the accelerometer for the stored data. The accelerometer then responds (e.g., arrow 240) with the stored data. Once the wired and/or wired transceiver receives the data, the transceiver facilitates an instruction (e.g., arrow 245) to the accelerometer that causes the accelerometer to enter into sleep mode (e.g., arrow 250), where the accelerometer remains (e.g., so long as the air cycle machine outputs vibrations that are lower than the threshold amplitude or until a prescribed wake-up time instance, as commanded by the management facility 101).

In addition, the air cycle machine controller processes the data to detect deviations, incorporates the deviation information into fault codes and maintenance check indicators and forwards the notification (e.g., arrow 255) output, which includes the fault codes and maintenance check indicators, to the health and usage management system, the cockpit avionics system, and central maintenance computer. Further, the air cycle machine controller may command the air cycle machine to operate in a safe mode upon receiving the deviation information.

Aspects of the present invention are described herein with reference to flowchart illustrations and/or arrow diagrams (also referred to as block diagrams) of methods, apparatus (systems), and computer program products according to embodiments of the invention. It will be understood that each arrow/circle (also referred to as block) of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method executed by a detection device and by a processor of a management facility to detect operational deviations by an air cycle machine of an aircraft from expected operations, the detection device of the aircraft being incorporated in the air cycle machine, the management facility being connected to the detection device,
   the detection device comprising an accelerometer coupled to a transceiver that communicates a sampled input to the processor of the management facility,
   the computer-implemented method comprising:
   operating the detection device in sleep mode while the air cycle machine outputs vibrations that are lower than a threshold amplitude or until a prescribed wake-up time instance;
   sensing, by the accelerometer, a plurality of environmental conditions of the air cycle machine subsequent to the detection device receiving a wake up event comprising when the vibrations exceed the threshold amplitude or at the prescribed wake-up time instance, the wake up event causing the detection device to wake up from the sleep mode;
   storing, by the detection device, a plurality of environmental conditions as the sampled input;
   initiating a request, by the management facility to the detection device, for the sampled input in response to a request event, the request causing the detection device to wake up from the sleep mode;
   receiving, by the management facility from the detection device, the sampled input in response to the request;
   processing the sampled input, by the management facility, to detect whether the plurality of environmental conditions includes at least one deviation from the expected operations of the air cycle machine; and
   generating, by the management facility, a notification output in response to the plurality of environmental conditions including the at least one deviation.

2. The method of claim 1, further comprising:
   instructing the air cycle machine to operate in safe mode in response to detecting the deviation.

3. The method of claim 1, wherein the deviation is a surge vibration by the air cycle machine.

4. The method of claim 1, wherein the deviation is one of a plurality of deviations from the expected operation.

5. The method of claim 4, wherein the plurality of deviations indicate at least a vibration trend by the air cycle machine.

6. The method of claim 1, further comprising:
   causing a servicing of the air cycle machine by sending the notification output to a sub-system, the servicing corresponding to a type of the deviation.

7. The method of claim 1, further comprising:
   causing the air cycle machine to operate at a reduced rate when the deviation is detected.

8. A computer program product, the computer program product comprising a computer readable storage medium having program instructions to detect operational deviations by an air cycle machine of an aircraft from expected operations embodied therewith, the program instructions executable by a detection device and by a processor of a management facility of the aircraft connected to the detection device of the aircraft, the detection device comprising an accelerometer coupled to a transceiver that communicates a sampled input to the processor of the management facility, the detection device being incorporated in the air cycle machine, the program instructions executable to cause:
   operating the detection device in sleep mode while the air cycle machine outputs vibrations that are lower than a threshold amplitude or until a prescribed wake-up time instance;
   sensing, by the accelerometer, a plurality of environmental conditions of the air cycle machine subsequent to the detection device receiving a wake up event comprising when the vibrations exceed the threshold amplitude or at the prescribed wake-up time instance, the wake up event causing the detection device to wake up from the sleep mode;
   storing, by the detection device, a plurality of environmental conditions as the sampled input;
   initiating a request, by the management facility to the detection device, for the sampled input in response to a request event, the request causing the detection device to wake up from the sleep mode;
   receiving, by the management facility from the detection device, the sampled input in response to the request;
   processing the sampled input, by the management facility, to detect whether the plurality of environmental conditions includes at least one deviation from the expected operations of the air cycle machine; and
   generating, by the management facility, a notification output in response to the plurality of environmental conditions including the at least one deviation.

9. The computer program product of claim 8, further comprising:
   instructing the air cycle machine to operate in safe mode in response to detecting the deviation.

10. The computer program product of claim 8, wherein the deviation is a surge vibration by the air cycle machine.

11. The computer program product of claim 8, wherein the deviation is one of a plurality of deviations from the expected operation.

12. The computer program product of claim 11, wherein the plurality of deviations indicate at least a vibration trend by the air cycle machine.

13. The computer program product of claim 8, further comprising:
   causing a servicing of the air cycle machine by sending the notification output to a sub-system, the servicing corresponding to a type of the deviation.

* * * * *